May 7, 1957  N. DE MAKAY  2,791,557
CONDUCTOR MEANS FOR ELECTRODES
Filed Aug. 25, 1954
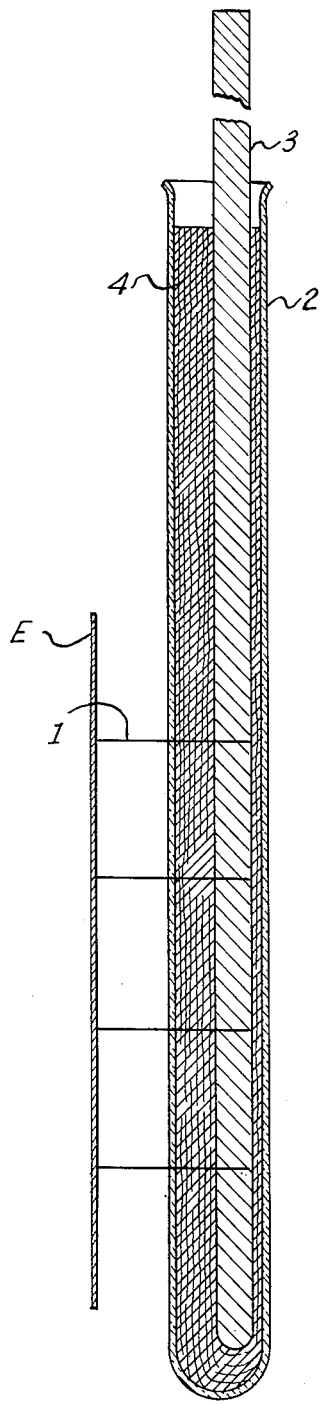
INVENTOR.
Nicolas de Makay
BY
Pollard, Johnston, Smythe & Robertson
ATTORNEYS 2,791,557
Patented May 7, 1957

2,791,557
CONDUCTOR MEANS FOR ELECTRODES
Nicolas de Makay, Rio de Janeiro, Brazil Application August 25, 1954, Serial No. 452,010

4 Claims. (Cl. 204—286)

This invention relates to conductor means for electrodes and more particularly to conductor means for platinum electrodes used in the manufacture of hydrogen peroxide.

Platinum electrodes are presently used in a number of electrolytic processes. These platinum electrodes are customarily made of platinum strips or platinum wire nets. Due to the high cost of platinum, cheaper metals, such as copper or aluminum, are used customarily as conductors for energizing the electrodes. However, these conductor means must be protected from the corrosive action of the electrolytes. In general, two different procedures have been used heretofore to achieve this objective:

1. The metal conductor is coated with hard rubber or with some corrosion-resistant plastic material, or
2. The metal conductor is coated with tantalum.

The use of the previously proposed cheaper conductors presents several disadvantages, especially in the manufacture of hydrogen peroxide, which may be summarized as follows:

(a) Rubber coatings are not completely resistant to the electrolyte containing persulfate and karo-acid (persulfuric acid) and, therefore, such rubber coatings have to be replaced after a few months of use.

(b) Plastic coatings similarly do not provide complete protection against corrosion of the electrolyte and, as a result, the copper or aluminum conductor gradually decomposes, thereby impeding the operation of the process, and (c) Tantalum coatings do not have the defects associated with the use of the two other coatings discussed hereinbefore, but such materials are very expensive. Additionally, the establishment of a good and permanent contact between platinum and tantalum is quite difficult to achieve.

It is a principal object of this invention to provide improved conductor means for platinum electrodes used in electrolytic processes which will overcome the difficulties experienced in the previously discussed prior art practices.

Other objects, advantages and features of the invention will be evident from the more detailed following description which is merely exemplary.

In the drawing:

Fig. 1 is a sectional view of an electrode made in accordance with the invention.

The devices used for achieving the objectives of this invention will be apparent from the attached diagrammatic drawing of a platinum electrode and a conductor means for energizing the electrode, said conductor means including a connector portion to which a source of current can be connected. In the drawing, platinum wire conductors 1 for conducting an electric current to the electrode E are fused into a glass tube 2 closed at one end. Then this glass tube is partially filled throughout its length, by using conventional molding techniques with a molten eutectic alloy of lead and tin 3 which, upon solidifying, forms the conductor to the platinum wires 1. However, the glass tube cannot be filled throughout its whole cross sectional area due to the fact that the alloy has a larger coefficient of expansion than the glass and would crack the glass upon cooling at the point where the platinum wires are fused into the glass.

In order to secure a good electric contact between the platinum wires and the lead-tin alloy conductor, the platinum wires are advantageously electroplated with tin, or other metals with which the tin alloy can be easily soldered, prior to the introduction of the molten eutectic alloy of lead and tin. This electroplating may be advantageously achieved by filling the glass tube with an electroplating solution and the platinum wires thereafter used as cathodes in accordance with well known electroplating practices. The electrolytically deposited tin, or other metal, ultimately forms an alloy with the platinum, thereby permitting a perfect electric connection with the lead-tin conductor when the molten alloy is introduced into the tube.

In accordance with a special practice of the invention, the interiors of the electrodes are protected against corrosive materials, such as sprays of acids of the type hereinbefore discussed, by filling the unfilled parts 4 of the glass tube with paraffin, or similar materials inert to such corrosive electrolytes.

The glass tube can be protected against mechanical shocks during transportation and assembly by placing it inside a plastic tube cut open on one side, the tube being removed.

It will be seen from the foregoing discussion that the practice of this invention requires relatively inexpensive materials and that the conductor means is easy to construct. A further advantage of the practice of this invention resides in the fact that if the electrodes are broken in service, the materials of which the electrode and the conductor means are constructed would not contaminate and cause troubles in the electrolytic process. More particularly, breakage of the conductor means of this invention would not contaminate the electrolyte used in the production of hydrogen peroxide since lead and tin do not interfere with the manufacture of such material while the breakage of the rubber or plastic coated copper conductors conventionally used would interfere with the manufacture of the hydrogen peroxide.

It will be understood that the present invention is not limited to the specific illustrative embodiments or manipulative details disclosed hereinbefore, for the invention extends to all variations which will occur to those skilled in the art upon consideration of the disclosure.

The scope of the invention is to be measured by the appended claims.

What is claimed is:

1. A process for producing a conductor means for energizing a platinum electrode used in the production of hydrogen peroxide by an electrolytic process, which comprises fusing a plurality of platinum wires into a wall of a closed bottom glass tube with the extremities thereof extending into and outside of said tube, introducing an electrolyte into said tube and electroplating the platinum wires extending thereinto with a metal which is compatible with a lead-tin alloy, removing the electrolyte, immersing a portion of each of the wires extending into said tube in a lead-tin alloy by only partially transversely filling the tube with a liquefied eutectic alloy of lead and tin, and cooling the liquefied alloy to solidify it and fuse the immersed part of said wires with said alloy in embedded contact therewith.

2. In a platinum electrode for electrolytic processes, the combination including a glass tube, a plurality of platinum wires extending through the walls of said tube and fused thereto, a platinum electrode attached to said platinum wires at the exterior of said tube, and lead-tin alloy conductor means along the interior of said tube contacting a portion of each of said platinum wires within said tube, the transverse section of said conductor means only partially transversely filling said tube.

3. In a platinum electrode for electrolytic processes, the combination including a glass tube having a closed end, a plurality of platinum wires extending through the walls of said tube and fused thereto, a platinum electrode attached to said platinum wires at the exterior of said tube, and lead-tin alloy conductor means along the interior of said tube contacting a portion of each of said platinum wires within said tube, the transverse section of said conductor means only partially transversely filling said tube, said conductor means having a connecting portion for receiving an electrical connection to energize said electrode.

4. In a platinum electrode for electrolytic processes, the combination including a glass tube having a closed end, a plurality of platinum wires extending through the walls of said tube and fused thereto, a platinum electrode attached to said platinum wires at the exterior of said tube, and lead-tin alloy conductor means along the interior of said tube contacting a portion of each of said platinum wires within said tube, the transverse section of said conductor means only partially transversely filling said tube, said conductor means having a connection portion for receiving an electrical connection to energize said electrode, the portion of said wires extending into said tube being plated with a metal compatible with said lead-tin alloy.

References Cited in the file of this patent

UNITED STATES PATENTS

| | | |
|---|---|---|
| 507,374 | Lyte | Oct. 24, 1893 |
| 658,891 | Carmichael | Oct. 2, 1900 |

FOREIGN PATENTS

| | | |
|---|---|---|
| 132,588 | Germany | July 22, 1902 |